(12) United States Patent
Nakakimura

(10) Patent No.: US 11,276,565 B2
(45) Date of Patent: Mar. 15, 2022

(54) DATA PROCESSING DEVICE FOR IMAGING MASS SPECTROMETRIC ANALYSIS

(71) Applicant: SHIMADZU CORPORATION, Kyoto (JP)

(72) Inventor: Yuriko Nakakimura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/966,664

(22) PCT Filed: Feb. 2, 2018

(86) PCT No.: PCT/JP2018/003601
§ 371 (c)(1),
(2) Date: Jul. 31, 2020

(87) PCT Pub. No.: WO2019/150554
PCT Pub. Date: Aug. 8, 2019

(65) Prior Publication Data
US 2021/0035790 A1     Feb. 4, 2021

(51) Int. Cl.
 *H01J 49/36* (2006.01)
 *H01J 49/00* (2006.01)
 *G01N 27/62* (2021.01)

(52) U.S. Cl.
 CPC ......... *H01J 49/0036* (2013.01); *G01N 27/62* (2013.01); *H01J 49/0004* (2013.01)

(58) Field of Classification Search
 CPC ... H01J 49/0036; H01J 49/0004; G01N 27/62
 (Continued)

(56) References Cited

U.S. PATENT DOCUMENTS

2016/0335473 A1* 11/2016 Pamelard ............... G16B 45/00
2018/0197726 A1*  7/2018 Yamaguchi ........... G16B 40/30

FOREIGN PATENT DOCUMENTS

JP     2009-025275 A    2/2009
JP     2017-509945 A    4/2017
(Continued)

OTHER PUBLICATIONS

"IMScope TRIO Imaging Mass Microscope", [online], [accessed on Jun. 5, 2017], Shimadzu Corporation, Internet.
(Continued)

*Primary Examiner* — Michael Maskell
(74) *Attorney, Agent, or Firm* — Sughrue Mion, PLLC

(57) ABSTRACT

The efficiency and accuracy of search for a compound exhibiting a distribution similar to that of a reference image such as an optical microscope image are improved in imaging mass spectrometric analysis. In an imaging mass spectrometer including a data processing device according to the present invention, a regression analysis executor (16) executes PLS using mass spectrum data and reference image data for each measurement point and calculates a regression coefficient reflecting the similarity of the distribution for each m/z value. An m/z value search section (17) selects m/z values in descending order of regression coefficients, but in each search m/z range obtained by dividing the entire measurement m/z range for each predetermined width, excludes a search m/z range including one m/z value already selected from the search target. Since the peak originating from a certain compound and its isotope peak fall within almost one search m/z range on the mass spectrum, the process described above can avoid selection of the m/z value of ions originating from a certain compound and the m/z value of ions originating from its isotope in duplicate as an m/z candidate.

12 Claims, 7 Drawing Sheets

(58) Field of Classification Search
USPC ..... 250/281, 282; 702/22–24, 27, 28, 30, 32
See application file for complete search history.

(56) References Cited

FOREIGN PATENT DOCUMENTS

| | | |
|---|---|---|
| WO | 2015/052842 A1 | 4/2015 |
| WO | 2015/104512 A1 | 7/2015 |
| WO | 2017/002226 A1 | 1/2017 |
| WO | WO-2017002226 A1 * | 1/2017 .......... H01J 49/0036 |

OTHER PUBLICATIONS

International Search Report for PCT/JP2018/003601 dated Apr. 10, 2018 [PC/ISA/210].
Written Opinion for PCT/JP2018/003601 dated Apr. 10, 2018 [PC/ISA/210].

* cited by examiner

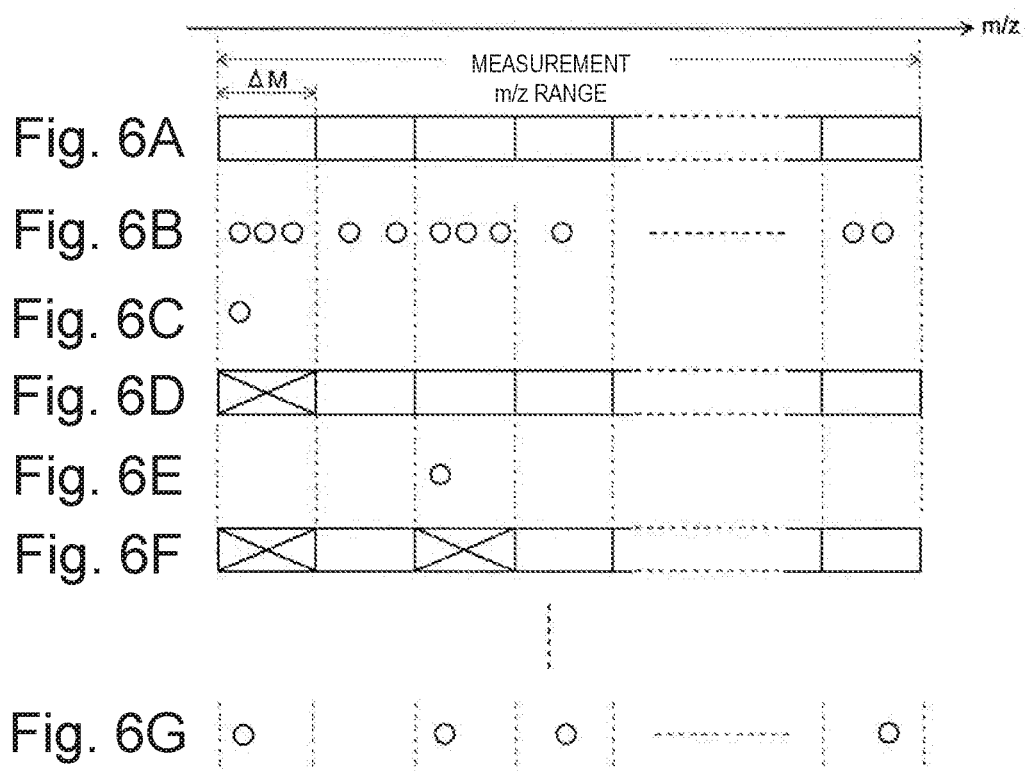

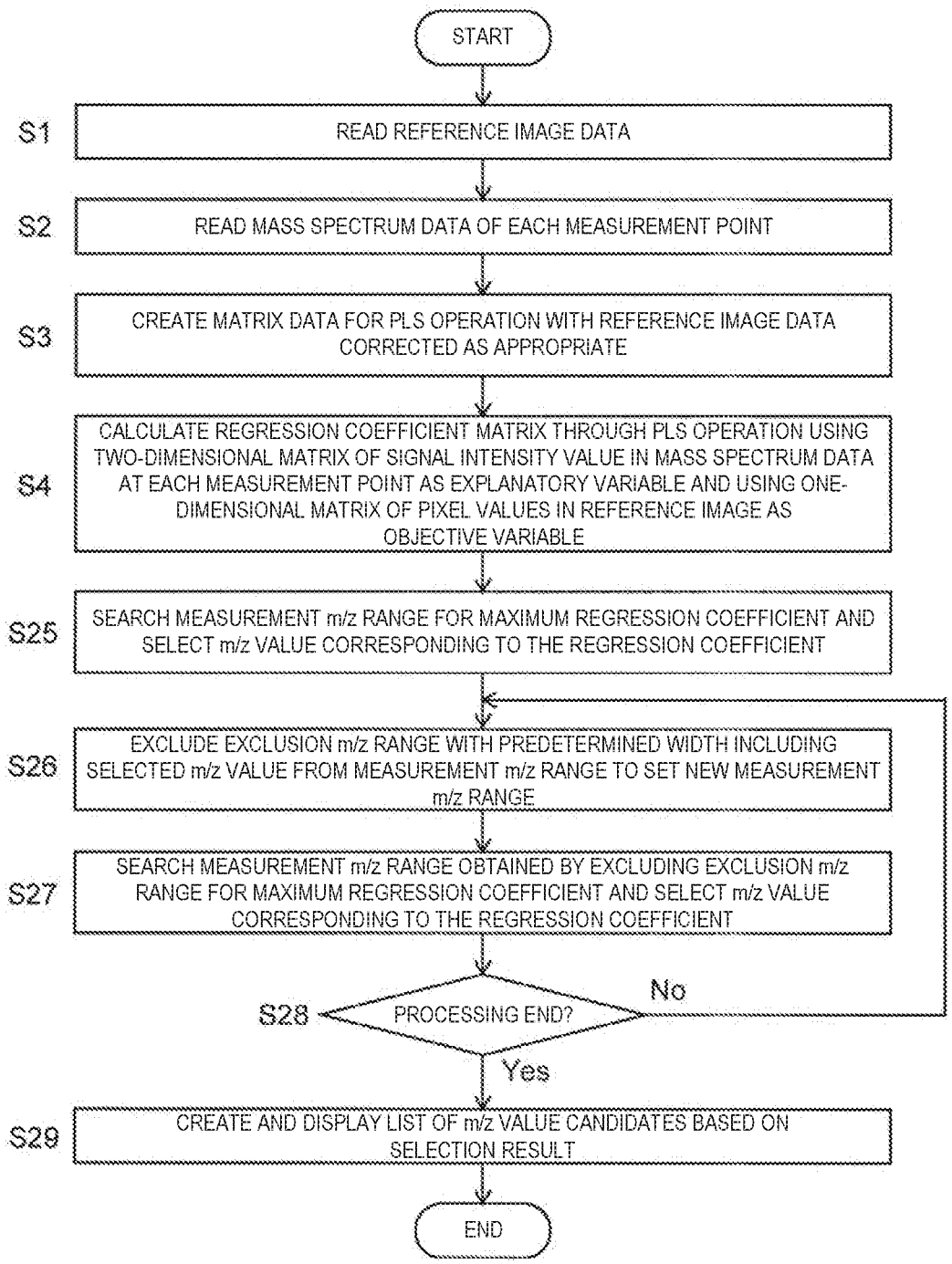

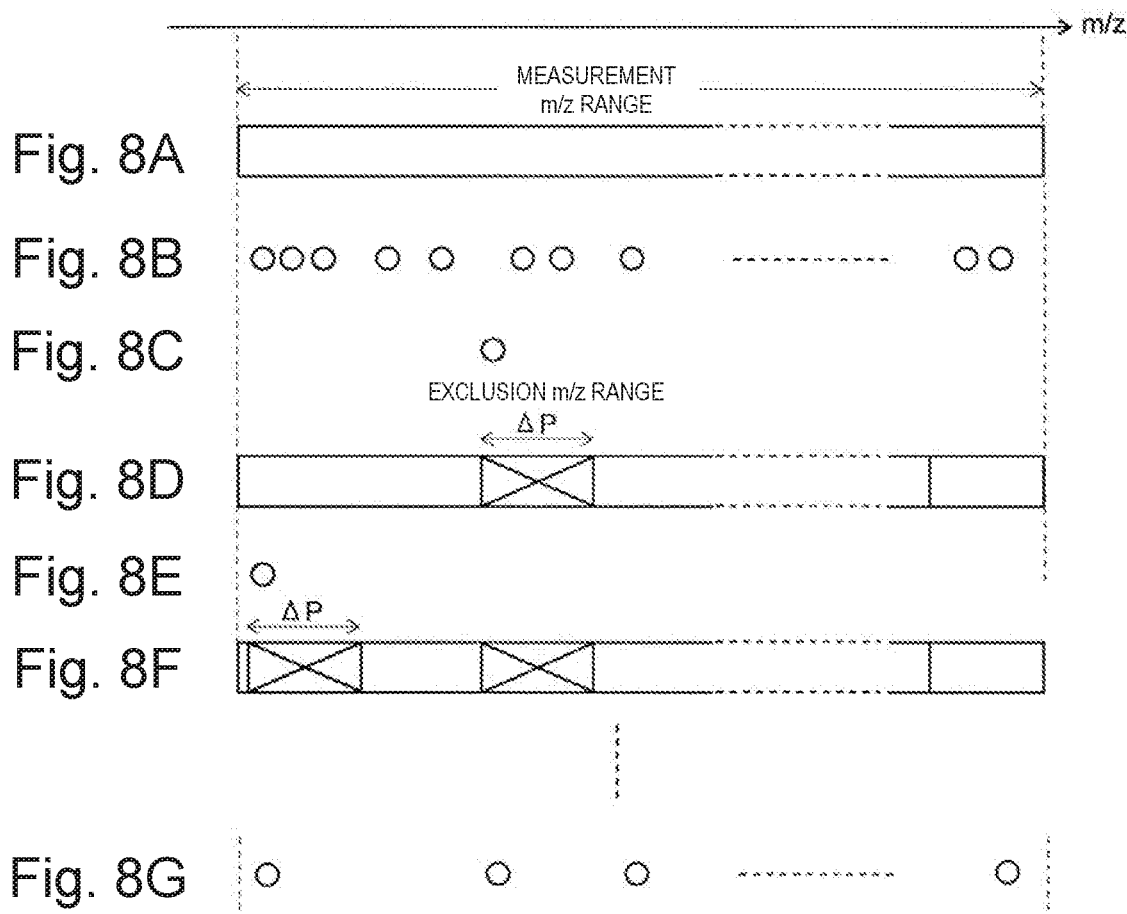

DATA PROCESSING DEVICE FOR IMAGING MASS SPECTROMETRIC ANALYSIS

CROSS REFERENCE TO RELATED APPLICATIONS

This application is a National Stage of International Application No. PCT/JP2018/003601 filed Feb. 2, 2018.

TECHNICAL FIELD

The present invention relates to a data processing device for processing mass spectrum data acquired by an imaging mass spectrometer capable of acquiring mass spectrum data for each of multiple measurement points in a measurement area on a sample.

BACKGROUND ART

Mass spectrometric imaging is a method of performing mass spectrometric analysis on each of a plurality of measurement points (micro areas) in a two-dimensional measurement area on a sample such as a slice of biological tissue to examine a spatial distribution of matters having a certain mass. The method has been proactively applied to drug discovery, biomarker search, and investigation for the cause of various diseases/illnesses. A mass spectrometer for performing the mass spectrometric analysis imaging is generally referred to as an imaging mass spectrometer (see Non-Patent Literature 1 and the like).

An imaging mass spectrometer generally obtains mass spectrum data (including MS$^n$ spectrum data where n is equal to or larger than 2) over a predetermined mass-to-charge ratio (m/z) range for each measurement point on a sample. Then, when the user designates the mass-to-charge ratio of ions originating from a compound to be observed, the signal intensity at each measurement point at the mass-to-charge ratio designated is extracted. Then, a two-dimensional image (MS image) is obtained in which values of the signal intensity are visualized based on gray scale or color scale while being associated with the positions of the respective measurement points. The two-dimensional image is displayed on a screen of a display unit.

In recent years, such imaging mass spectrometers have been actively used for observing a two-dimensional distribution of a certain compound in a sample cut out from a biological tissue, in researches involving analysis such as pharmacokinetic analysis, metabolic pathway analysis, and molecular correlation analysis. In such an analysis, the target compound to be observed is determined, and the two-dimensional distribution of the compound can be visualized by a method such as vital staining in not a few cases (see Patent Literature 1 and the like).

For example, adipose tissue cells of animals such as mice and humans are known to store lipid droplets. The lipid droplets can be observed using an optical microscope, by applying hematoxylin-eosin (HE) staining to a sample such as a slice of biological tissue of such an animal. In this context, an example is considered where a slice of the liver of a mouse with a fatty liver is searched for a compound related to fat, which is the target. In such a case, what needs to be searched is a mass-to-charge ratio value yielding an MS image with an image pattern similar to an HE stained image as a result of HE staining on the slice of biological tissue. Hereinafter, an image used to find an MS image with a predetermined image pattern in this manner will be referred to as a "reference image". This reference image may simply be an optical microscopic image of a sample such as a slice of biological tissue, or may be a stained image as described above or a fluorescent microscopic image.

As a general procedure for searching for the mass-to-charge ratio value (the mass-to-charge ratio may be hereinafter referred to as "m/z") exhibiting a two-dimensional distribution with an image pattern similar to that of the reference image as described above, first of all, a Total Ion Count or Total Ion Current (TIC) spectrum is generated. This TIC is a result of integrating the signal intensity values in multiple mass spectra at all the measurement points within a measurement area, for each mass-to-charge ratio value. Then, in the TIC spectrum, the peaks are selected in descending order of the signal intensity values, and the user visually determines the similarity between the MS image and the reference image in the image pattern at the m/z value corresponding to the selected peaks.

Unfortunately, the TIC spectrum generally includes multiple peaks originating from various compounds. Thus, even when the peaks are narrowed down to those with the signal intensity values being equal to or larger than a predetermined threshold, it takes quite a large amount of effort to generate the MS image and to check the image pattern. Furthermore, such work takes so much time, and thus is inefficient.

In view of this, a statistical analysis method has conventionally been proposed with which the m/z value yielding the MS image with an image pattern similar to that of the reference image is searched for automatically, that is, without relying on the human's decision. This method, for example, includes performing regression analysis using a pixel value of the reference image as an objective variable and the mass spectrum data at each measurement point as an explanatory variable. Then, the compound with a distribution similar to the image pattern of the reference image is found by selecting an m/z value having a large absolute value of the regression coefficient obtained as a result.

Such a method is effective in extracting an accurate m/z value without relying on human labor, but also involves the following problems.

Specifically, many compounds contained in biological samples have isotopes. Measurement on a sample containing many kinds of compounds with isotopes using an imaging mass spectrometer to obtain the TIC spectrum as described above results in many isotope peaks monitored in the TIC spectrum. Since isotope peaks originating from the same compound exhibit similar spatial distributions, obtaining candidates of the m/z value with the method described above may only end up in the m/z value(s) of the isotope peak(s) originating from one or a few compounds selected all the time. The isotope peaks originating from one compound are different from each other in the m/z value but correspond to the same compound. Thus, fewer compounds are extracted, which may result in a search result failing to include alternative compounds exhibiting a distribution similar to that of the reference image. In addition, it is a waste of time for the user to check the two-dimensional distributions of a plurality of matters that are substantially the same compound.

CITATION LIST

Patent Literature

Patent Literature 1: WO 2017/002226 A (paragraph [0037])
Patent Literature 2: JP 2009-25275 A

Non Patent Literature

Non Patent Literature 1: "iMScope TRIO Imaging Mass Microscope", [online], [accessed on Jun. 5, 2017], Shimadzu Corporation, Internet

SUMMARY OF INVENTION

Technical Problem

The present invention is made in view of the above problems, and an object of the present invention is to provide a data processing device for imaging mass spectrometric analysis enabling, in a search for a compound exhibiting a two-dimensional distribution similar to the image pattern of the reference image through statistical analysis processing and the like, ions originating from a wide variety of compounds to be obtained as candidates of the target compound with the influence of isotopes of the compounds eliminated.

Solution to Problem

To achieve the object described above, the present invention provides a data processing device for imaging mass spectrometric analysis that processes mass spectrum data obtained at a plurality of measurement points in a two-dimensional measurement area on a sample, the data processing device including:

a) a reference image information acquisition section that acquires reference image data forming a reference image for the measurement area;

b) an analysis processor that calculates, for each mass-to-charge ratio, an index value related to similarity of an image pattern of an MS image exhibiting a distribution of a signal intensity of ions having the mass-to-charge ratio and the reference image, through statistical analysis based on the mass spectrum data of each measurement point in the measurement area and the reference image data acquired by the reference image information acquisition section; and c) a mass-to-charge ratio value search section that searches for and selects a mass-to-charge ratio exhibiting a relatively large index value among index values for respective mass-to-charge ratios obtained by the analysis processor, and excludes, from a selection target, a mass-to-charge ratio value existing in a predetermined mass-to-charge ratio range including one mass-to-charge ratio value already selected, the mass-to-charge ratio value exhibiting an index value smaller than an index value corresponding to the mass-to-charge ratio value.

The data processing device for imaging mass spectrometric analysis according to the present invention can use the reference image that is obtained by various methods other than mass spectrometric analysis. Examples of the reference image may include observation images obtained with an electron microscope, an optical microscope, a fluorescence microscope, or the like; images obtained by Raman spectroscopy, measurement of emission intensity of electromagnetic waves having various wavelengths (terahertz range, far-infrared range, visible range, ultraviolet range, X-ray range, or the like), absorption measurement, or the like; and images obtained by various measurements and analyzes such as surface analysis by PET (Positron Emission Tomography) measurement, MRI (Magnetic Resonance Imaging) measurement, ESR (Electron Spin Resonance) measurement, CT (Computed Tomography) measurement, or EPMA (Electron Probe MicroAnalyser).

In the data processing device for imaging mass spectrometric analysis according to the present invention, the reference image information acquisition section reads data constituting an optical image obtained by capturing a stained sample with an optical microscope, for example. The analysis processor performs statistical analysis based on the mass spectrum data of each measurement point in the measurement area and the reference image data to calculate an index value related to similarity of image patterns of the MS image exhibiting the distribution of the signal intensity of ions having an m/z for each m/z value and the reference image.

Specifically, for example, partial least-square regression analysis (PLS) can be used as a statistical analysis method. In this case, through regression analysis using the mass spectrum data at each measurement point as an explanatory variable and the pixel value of each pixel in the reference image corresponding to each measurement point as an objective variable, the regression coefficient for each m/z value can be obtained as the index value.

If the index value such as the regression coefficient is large (in a strict sense, if the absolute value of the regression coefficient is large since the regression coefficient can be negative), the two-dimensional distribution of the m/z value providing this regression coefficient should be close to the image pattern of the reference image. However, as described above, if an m/z value having a large index value described above is simply selected, ions originating from an isotope of the same compound will also be selected. To address this, the mass-to-charge ratio value search section basically searches for m/z values exhibiting relatively large index values among the calculated index values, but excludes m/z values that provide smaller index values existing in a predetermined m/z range including one m/z value already selected, from the selection target of further m/z values. In other words, these m/z values are disregarded.

In general, the difference in m/z values between the peak of ions originating from a certain compound and its isotope peak on the mass spectrum is as small as about several Da. Thus, if the m/z range with respect to the peak originating from one compound molecule is determined as appropriate, the isotope peak will be substantially within the m/z value range. Accordingly, with the process described above by the mass-to-charge ratio value search section, when the m/z value of ions originating from a certain compound is selected, subsequent selection of m/z values of ions originating from isotopes of the compound can be practically almost entirely avoided. That is, the m/z value originating from a certain compound and the m/z value originating from an isotope of the compound are rarely selected in duplicate.

In a first aspect of the data processing device for imaging mass spectrometric analysis according to the present invention, a plurality of consecutive mass-to-charge ratio ranges obtained by dividing an entire measurement mass-to-charge ratio range for each predetermined mass-to-charge ratio width may be defined, and when a mass-to-charge ratio value exhibiting a largest index value in one mass-to-charge ratio search range is selected within the range, the mass-to-charge ratio value search section may be configured to exclude other mass-to-charge ratio values included in the mass-to-charge ratio search range from the selection target.

With this configuration, it is only necessary to perform the process of excluding a predetermined mass-to-charge ratio search range as a unit from the selection target of m/z values. In this manner, it is easy to perform this process of excluding such m/z range.

In the first aspect described above, the mass-to-charge ratio value search section may be configured to select mass-to-charge ratio values exhibiting a largest index value in each of the plurality of mass-to-charge ratio search ranges, and thereafter select a mass-to-charge ratio value exhibiting an index value that is equal to or more than a predetermined threshold among the selected plurality of mass-to-charge ratio values.

In this configuration, while m/z values originating from an isotope are excluded, m/z values with index values that are equal to or more than a predetermined threshold, that is, m/z values that are assumed to have high similarity in distribution with the reference image can be selected.

Furthermore, in the first aspect, the mass-to-charge ratio value search section may be configured to select a plurality of mass-to-charge ratio values in descending order of index values in the entire mass-to-charge ratio range of the measurement target.

With this configuration, while m/z values originating from an isotope are excluded, appropriate m/z values can be selected in descending order of index values, that is, in descending order of possibility of similarity in distribution with the reference image. Thus, it is possible to efficiently select an ion candidate originating from a target compound having a distribution close to that of the reference image.

In a second aspect of the data processing device for imaging mass spectrometric analysis according to the present invention, the mass-to-charge ratio value search section may be configured to select one mass-to-charge ratio value, thereafter determine an exclusion range with same or different widths set in a decreasing direction and an increasing direction of the mass-to-charge ratio with respect to the one mass-to-charge ratio value, and exclude other mass-to-charge ratio values included in the exclusion range from the selection target.

In this configuration, unlike the first aspect, the mass-to-charge ratio search range is not predetermined, and the exclusion m/z range is determined according to the actually selected m/z value. In the first aspect, in the case where a peak originating from one compound molecule and its isotope peak exist across adjacent mass-to-charge ratio search ranges on the mass spectrum, the m/z value of the isotope peak cannot be excluded from the selection target. By contrast, in the second aspect, ions originating from one or more isotopes of a certain compound can be almost completely excluded from the selection target.

Note that, also in this configuration, as in the first aspect, the mass-to-charge ratio value search section can be configured to select a plurality of mass-to-charge ratio values in descending order of index values in the entire mass-to-charge ratio range of the measurement target. As a result, it is possible to efficiently select an ion candidate originating from a target compound having a distribution close to that of the reference image.

Advantageous Effects of Invention

The data processing device for imaging mass spectrometric analysis according to the present invention enables, in a search for a compound exhibiting a distribution similar to a reference image such as an optical microscope image, ions originating from a wide variety of compounds to be obtained with the influence of isotopes of the compounds substantially eliminated. Thus, a compound having a distribution close to that of the reference image can be found accurately and quickly.

BRIEF DESCRIPTION OF DRAWINGS

FIGS. 6A-6G are conceptual diagrams for explaining the m/z value search process illustrated in FIG. 5.

FIG. 7 is a flowchart of an m/z value search process in still another embodiment of an imaging mass spectrometer including a data processing device for imaging mass spectrometric analysis according to the present invention.

FIGS. 8A-8G are conceptual diagrams for explaining the m/z value search process illustrated in FIG. 7.

DESCRIPTION OF EMBODIMENTS

An embodiment of an imaging mass spectrometer including a data processing device for imaging mass spectrometric analysis according to the present invention is hereinafter described with reference to the attached drawings.

Figure 1:
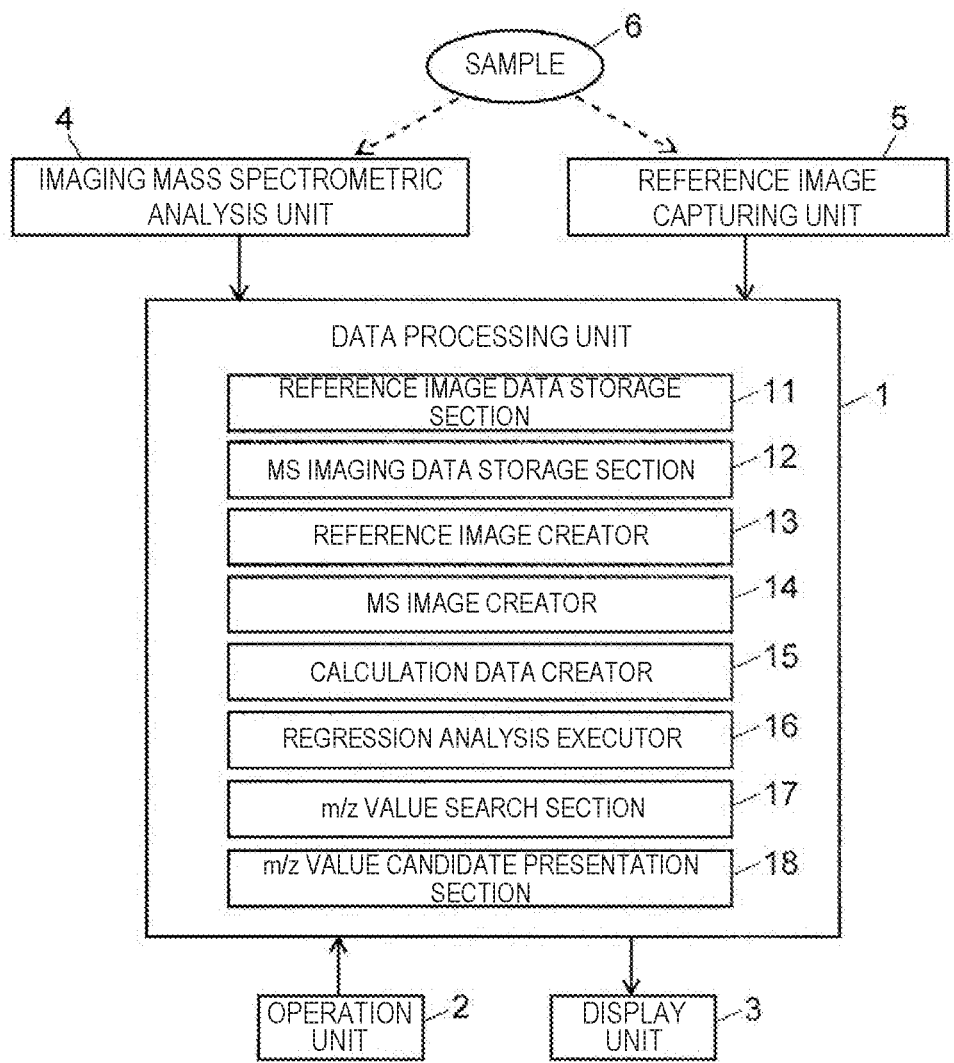
FIG. 1 is a schematic configuration diagram of an embodiment of an imaging mass spectrometer including a data processing device for imaging mass spectrometric analysis according to the present invention.
Figure 2:
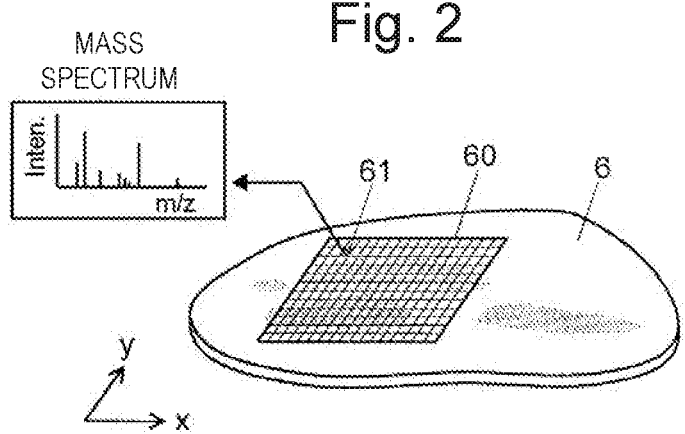
FIG. 2 is a conceptual diagram of a measurement area on a sample measured by an imaging mass spectrometric analysis unit in the imaging mass spectrometer according to the present embodiment.

FIG. 1 is a schematic configuration diagram of an imaging mass spectrometer according to the present embodiment. FIG. 2 is a conceptual diagram of a measurement area on a sample measured by an imaging mass spectrometric analysis unit in the imaging mass spectrometer according to the present embodiment.

The imaging mass spectrometer according to the present embodiment includes an imaging mass spectrometric analysis unit 4, a reference image capturing unit 5, a data processing unit 1, an operation unit 2, and a display unit 3. The operation unit 2 and the display unit 3 serve as user interfaces.

The imaging mass spectrometric analysis unit 4 includes, for example, a matrix assisted laser desorption/ionization ion trap time-of-flight mass spectrometer (MALDI-IT-TOFMS), and can acquire mass spectrum data on each of multiple measurement points (micro areas) within a two-dimensional measurement area on a sample 6 such as a slice of biological tissue. This mass spectrum data also includes $MS^n$ spectrum data, where n is equal to or larger than 2. On the other hand, the reference image capturing unit 5 is an optical microscope, a fluorescence microscope, a phase contrast microscope, or the like, and acquires reference images such as an optical microscope image, a stained image, a fluorescence image, a phase contrast microscope image, or the like in a range including at least the measurement area on the sample 6. Of course, as the reference images, two-dimensional images of the sample obtained by various other measurement methods can be used.

The data processing unit 1 receives mass spectrum data at each measurement point collected by the imaging mass spectrometric analysis unit 4 and reference image data obtained by the imaging by the reference image capturing unit 5 and performs a predetermined process. The data processing unit 1 includes functional blocks such as a reference image data storage section 11, an MS imaging data storage section 12, a reference image creator 13, an MS image creator 14, a calculation data creator 15, a regression analysis executor 16, an m/z value search section 17, and an m/z value candidate presentation section 18.

In general, the substance of the data processing unit 1 is a personal computer (or a higher performance workstation). The data processing unit 1 can be configured such that the functions of the above blocks are achieved by operating dedicated software installed in the computer on the computer. In this case, the operation unit 2 is a pointing device such as a keyboard or a mouse, and the display unit 3 is a display monitor.

As illustrated in FIG. 2, in the imaging mass spectrometer of the present embodiment, when a measurement area 60 is set on a biological sample 6 such as a mouse liver slice, the imaging mass spectrometric analysis unit 4 performs mass spectrometric analysis (or MS$^n$ analysis) for each of a large number of measurement points 61 within the range of the measurement area 60 and acquires mass spectrum data over a predetermined m/z range. As a result, a set of mass spectrum data corresponding to the number of measurement points 61 in the measurement area 60 (hereinafter referred to as "MS imaging data") is obtained, and this data is input from the imaging mass spectrometric analysis unit 4 to the data processing unit 1 and stored in the MS imaging data storage section 12.

The reference image capturing unit 5 captures, for example, a stained image of the same sample 6. It should be noted that the capturing range of the stained image obtained in this process does not have to match the measurement area 60, but includes the measurement area 60. The reference image data storage section 11 reads and stores reference image data forming the reference image obtained by the reference image capturing unit 5.

Figure 3:
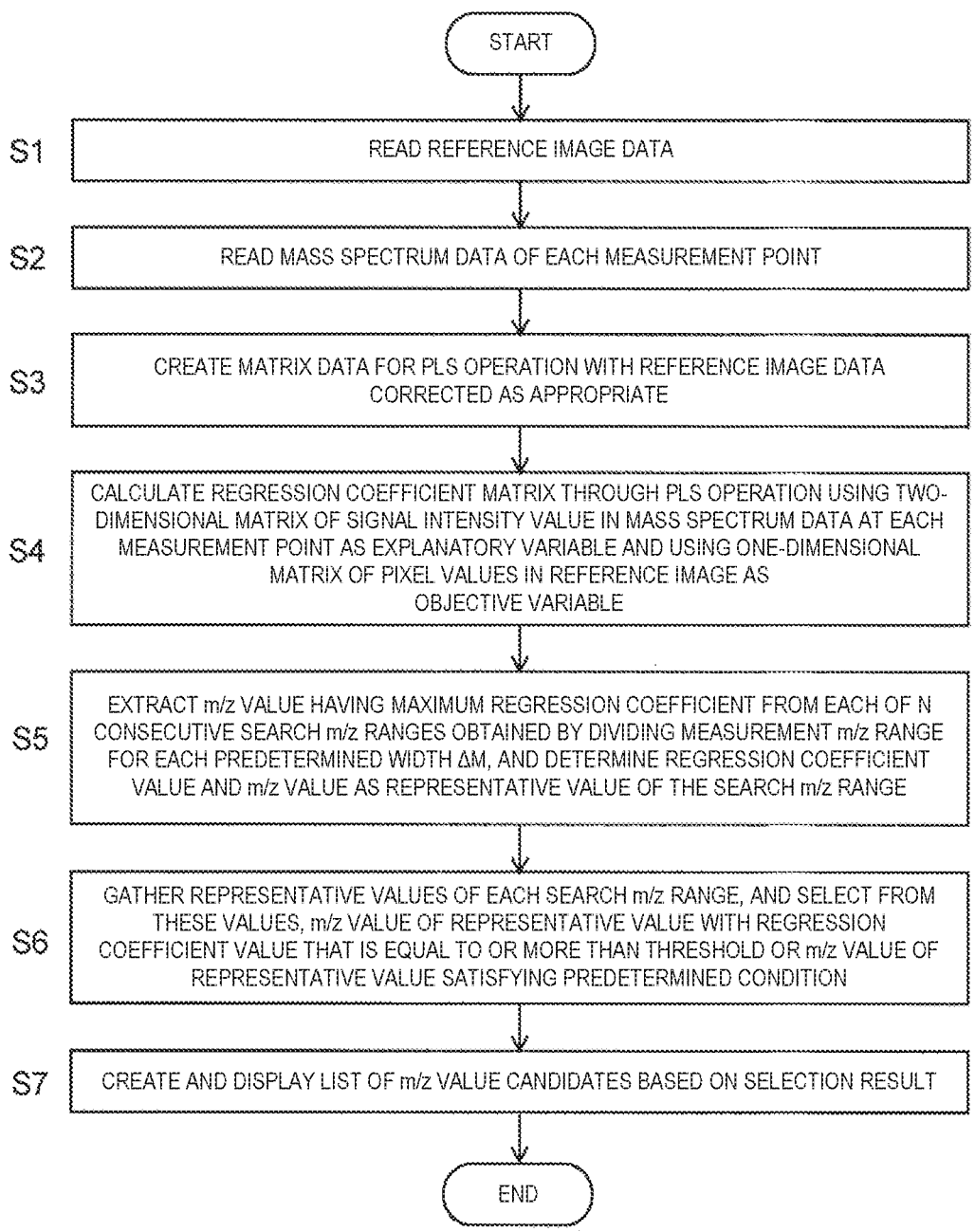
FIG. 3 is a flowchart of a characteristic m/z value search process in the imaging mass spectrometer according to the present embodiment.
Figure 4:
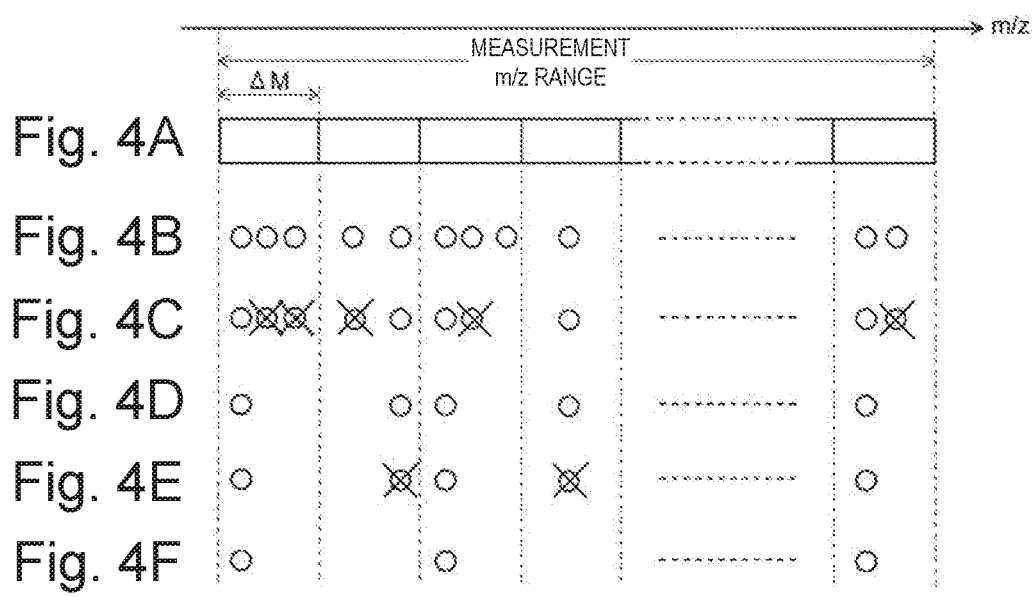
FIGS. 4A-4F are conceptual diagrams for explaining the m/z value search process illustrated in FIG. 3.

As described above, the characteristic m/z value search process performed by the data processing unit 1 in the state where the MS imaging data is stored in the MS imaging data storage section 12 and the reference image data is stored in the reference image data storage section 11 will be described with reference to FIGS. 3 and 4. FIG. 3 is a flowchart illustrating the procedure of this m/z value search process, and FIGS. 4A-4F are conceptual diagrams for explaining this m/z value search process.

When the process is started, the calculation data creator 15 reads the reference image data used for the process from the reference image data storage section 11 (step S1). In this process, the reference image creator 13 may create a reference image from the read reference image data and display the reference image on the screen of the display unit 3. Furthermore, the calculation data creator 15 reads the mass spectrum data of each measurement point 61 in the measurement area 60, which is used for the process, from the MS imaging data storage section 12 (step S2).

The calculation data creator 15 creates calculation data in the form of a matrix of pixel value data of each pixel in the reference image corresponding to each measurement point 61 in the measurement area 60 and the mass spectrum data for each measurement point 61 (step S3). As described above, when the capturing range of the reference image is wider than the measurement area 60, only the portion corresponding to the measurement area 60 in the reference image is cut and used. The size of the pixels of the reference image is usually different from that of the measurement point 61 on which the mass spectrometric analysis is performed, and in most cases, the pixels are much smaller than the measurement point 61. For this reason, it is preferable to perform a correction process or the like using pixel values of a plurality of pixels corresponding to one measurement point 61 to obtain a pixel value corresponding to this measurement point. Note that such data conversion process itself is known, and the method disclosed in, for example, Patent Literature 2 can be used. The matrix based on the pixel value data in the reference image is a one-dimensional matrix Y in which the pixel values $y_1, y_2, \ldots, y_n$ for each measurement point 61 are arranged. Furthermore, the matrix based on the mass spectrum data for each measurement point is a two-dimensional matrix X in which signal intensity values (peak intensity values) $x_{11}, x_{12}, \ldots, x_{1m}, x_{21}, x_{22}, \ldots, x_{2m}, \ldots, x_{n1}, x_{n2}, \ldots, x_{nm}$ for each measurement point and each m/z value are arranged two-dimensionally.

The regression analysis executor 16 executes operation of partial least-square regression analysis (PLS) widely known, using the two-dimensional matrix X of the signal intensity values based on the mass spectrum data created in step S3 as an explanatory variable (input variable) and the one-dimensional matrix Y of the pixel values based on the reference image data created in step S3 as an objective variable (output variable). A regression coefficient matrix is thus calculated (step S4).

The number of elements of this regression coefficient matrix is m, and this is a one-dimensional matrix in which regression coefficients for respective m/z values are arranged. The value of each regression coefficient indicates the degree of similarity of the image pattern (two-dimensional distribution status) for each m/z value between the reference image and the MS image, using the pixel values in the reference image as teacher data. Thus, the m/z value having a regression coefficient with a large absolute value is the m/z at which an MS image having an image pattern similar to the reference image is obtained. For example, if an m/z value having a regression coefficient equal to or more than a certain threshold is selected in the regression coefficient matrix, this m/z can be considered as the m/z of ions originating from a compound having a distribution similar to the image pattern of the reference image.

However, the m/z of ions originating from one compound and the m/z of ions originating from an isotope of the compound are different, and if multiple m/z values are selected, the same compound will be disadvantageously selected substantially in duplicate. To address this, the imaging mass spectrometer of the present embodiment performs the following characteristic process so as to eliminate isotopes as much as possible in selecting a significant m/z value from the regression coefficient matrix.

Here, as illustrated in FIG. 4A, a plurality of (N) consecutive search m/z ranges are defined in advance obtained by dividing the entire measurement m/z range for each predetermined m/z width ΔM. The m/z width ΔM can be determined as appropriate, such as 10 Da. The m/z value search section 17 searches each predetermined search m/z range as described above for the m/z value having a regression coefficient with the maximum absolute value, and determines the value of the regression coefficient and the m/z value to be representative values of the search m/z range. Through this process, N representative values are obtained (step S5).

Now, in FIG. 4B with the horizontal axis being the m/z axis, each element (that is, regression coefficient) in the regression coefficient matrix is indicated by a circle. In other words, the position of each circle on the m/z axis represents the m/z value corresponding to the regression coefficient. As illustrated in FIG. 4C, in each search m/z range, the elements indicated by circles in FIG. 4C remain after the elements whose regression coefficients are not maximum (elements that are crossed out) are excluded. If there is only one element in a certain search m/z range, this element necessarily serves as a representative value.

Next, the m/z value search section 17 selects the m/z values of the representative values having regression coefficients with absolute values that are equal to or more than a threshold among the N representative values obtained in step S5 (step S6). Alternatively, the m/z values of the representative values that satisfy another appropriate condition may be selected, instead of the condition involving regression coefficients with absolute values that are equal to or more than the threshold. For example, a predetermined number of representative values may be selected in descending order of the absolute values of the regression coefficients, and the m/z value of the representative values may be calculated. As a result, as illustrated in FIG. 4E, m/z values that do not satisfy a set condition are excluded, and the m/z value is selected that has the regression coefficient with the maximum absolute value in each search m/z range and satisfies the set condition.

The m/z value candidate presentation section 18 creates an m/z value candidate list listing all m/z values selected in step S6, and displays the list on the screen of the display unit 3 (step S7). The user confirms this and, for example, selects and designates one m/z value candidate using the operation unit 2. Then, in response to this designation, the MS image creator 14 extracts the signal intensity value of the designated m/z value from the mass spectrum data at each measurement point 61 in the measurement area 60, creates an MS image, and causes the screen of the display unit 3 to display the image. This allows the user to confirm, on the screen, the MS image of the m/z value candidate with an image pattern estimated to be similar to that of the reference image. In this stage, the reference image may be displayed together. Through such confirmation, the user can find an appropriate m/z value candidate and estimate a target compound from the m/z value.

Next, another embodiment of an imaging mass spectrometer including a data processing device for imaging mass spectrometric analysis according to the present invention will be described. The configuration of the imaging mass spectrometer of this embodiment is the same as the configuration of the imaging mass spectrometer of the above embodiment illustrated in FIG. 1, and the description thereof will be omitted.

Figure 5:
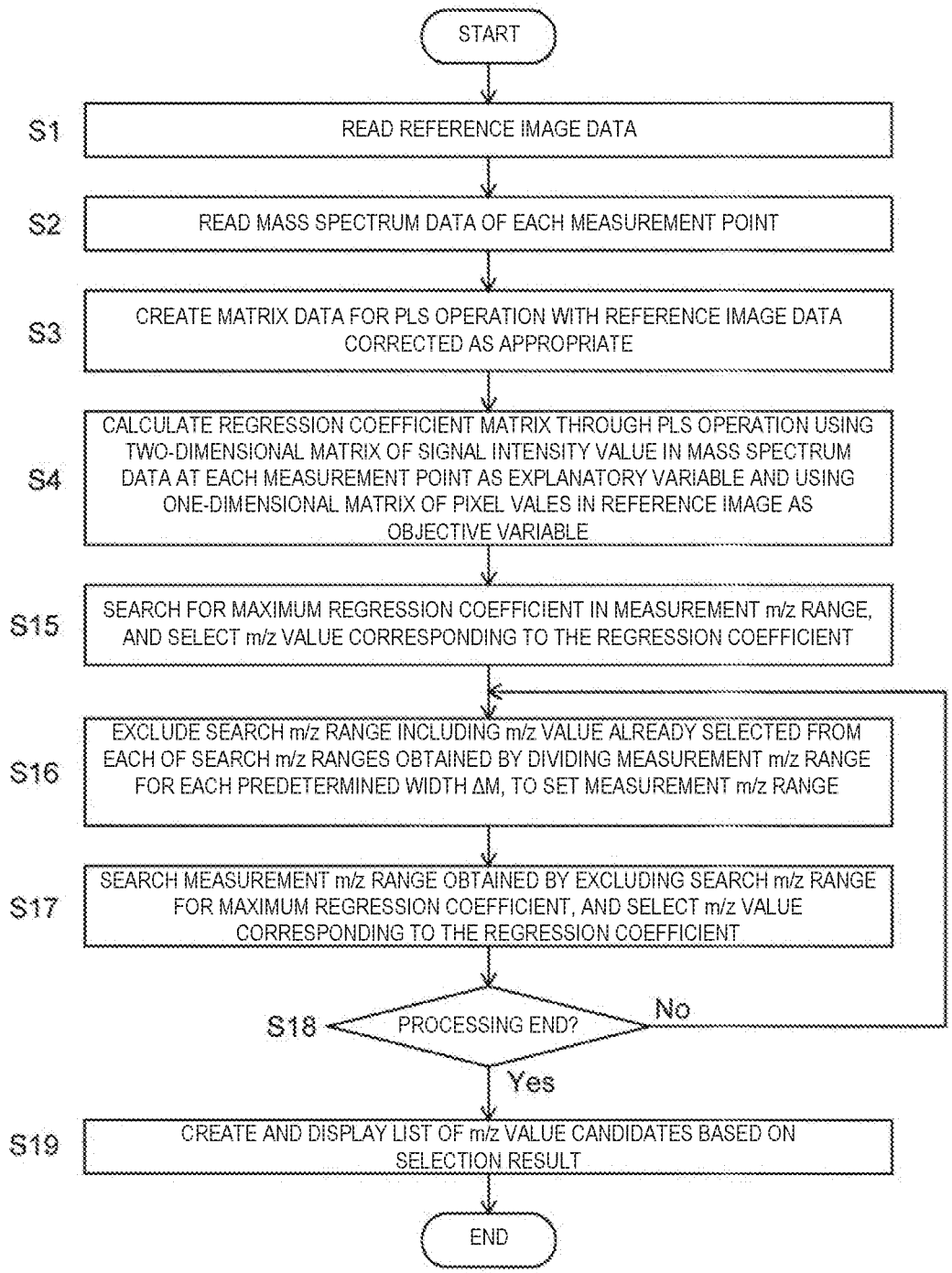
FIG. 5 is a flowchart of an m/z value search process in another embodiment of an imaging mass spectrometer including a data processing device for imaging mass spectrometric analysis according to the present invention.

FIG. 5 is a flowchart of a m/z value search process in the imaging mass spectrometer of this embodiment, and FIGS. 6A-6G are conceptual diagrams for explaining the m/z value search process. As illustrated in FIG. 5, the process in steps S1 to S4, that is, the process until the regression coefficient matrix is calculated through PLS is exactly the same as that in the above embodiment, and only a process of searching for an appropriate m/z value from the regression coefficient matrix, performed by the m/z value search section 17, is different from that in the above embodiment. Thus, this point will be described in detail below.

As illustrated in FIG. 6A, a plurality of consecutive search m/z ranges are defined in advance obtained by dividing the measurement m/z range for each predetermined m/z width ΔM as in the above embodiment. The m/z value search section 17 first searches the entire measurement m/z range for the regression coefficient with the maximum absolute value, and selects the m/z value corresponding to this regression coefficient (step S15). Now, assuming that the elements in the regression coefficient matrix exist as illustrated in FIG. 6B, the result of searching for the maximum regression coefficient among them is illustrated in FIG. 6C.

The m/z value search section 17 excludes the search m/z value range including the only m/z value selected in step S15, and sets a new measurement m/z range (step S16). That is, in the example of FIG. 6C, since the m/z value corresponding to one element indicated by a circle is selected, one search m/z range that is crossed out in FIG. 6D is excluded from the measurement m/z range, and a new measurement m/z range is set. Then, in the measurement m/z range from which the one or more search m/z ranges are excluded, the largest regression coefficient is searched for and the m/z value corresponding to this regression coefficient is selected (step S17). In this manner, even if an m/z value having a large regression coefficient exists in the previously excluded search m/z range, this m/z value will not be selected. Here, it is assumed that the one indicated by a circle in FIG. 6E is found in searching the measurement m/z range illustrated in FIG. 6D for the maximum regression coefficient.

After that, it is determined whether a predetermined ending condition is satisfied (step S18), and if not, the process returns from step S18 to step S16. For example, the ending condition may be selection of a predetermined number of m/z values or the elapse of a predetermined time from the start of the process. Alternatively, the ending condition may be that the maximum regression coefficient at that time is below a predetermined threshold. In this way, various ending conditions can be considered.

In any case, the process in steps S16 to S18 is repeated until it is determined in step S18 that the ending condition is satisfied. For example, when the process returns to step S16 after the one indicated by a circle illustrated in FIG. 6E is selected, as illustrated in FIG. 6F, the search m/z value range including the newly selected m/z value is excluded from the measurement m/z range. Thus, as in the above embodiment, at most one m/z value can be selected within one search m/z range. If there is any m/z value originating from an isotope exists within the search m/z range including the m/z value already selected, selection of this value will be avoided.

Although depending on the ending condition, the imaging mass spectrometer of this embodiment also selects at most one m/z value having a relatively large regression coefficient in each search m/z range as illustrated in FIG. 6G. The m/z value candidate presentation section 18 creates an m/z value candidate list listing m/z values selected in step S15 and multiple steps S17, and displays the list on the screen of the display unit 3 (step S19).

Next, still another embodiment of an imaging mass spectrometer including a data processing device for imaging mass spectrometric analysis according to the present invention will be described. The configuration of the imaging mass spectrometer of this embodiment is also the same as the configuration of the imaging mass spectrometer of the above embodiment illustrated in FIG. 1, and the description thereof will be omitted.

FIG. 7 is a flowchart of a m/z value search process in the imaging mass spectrometer of this embodiment, and FIGS. 8A-8G are conceptual diagrams for explaining the m/z value search process. As illustrated in FIG. 7, the process in steps S1 to S4, that is, the process until the regression coefficient matrix is calculated through PLS is exactly the same as that in the above embodiment, and only a process of searching for an appropriate m/z value from the regression coefficient matrix, performed by the m/z value search section 17, is different from that in the above embodiment. Thus, this point will be described in detail below.

The m/z value search section 17 first searches a given measurement m/z range for the regression coefficient with the maximum absolute value, and selects the m/z value corresponding to this regression coefficient (step S25). Now, among the regression coefficients illustrated in FIG. 8B, the result of searching for the maximum regression coefficient is illustrated in FIG. 8C.

The m/z value search section 17 defines an exclusion m/z range having a predetermined width before and after the one m/z value selected in step S25. Specifically, an m/z width ΔMa in the direction in which m/z decreases and an m/z width ΔMb (may be the same as ΔMa) in the direction in which m/z increases are set, and once a selected m/z value M1 is determined, the range of M1-ΔMa to M1+ΔMb is set as the exclusion m/z range. It is desirable to determine ΔMa and ΔMb so that isotopes of one compound are contained as much as possible while these widths are as small as possible. Once the exclusion m/z range is determined, the measurement m/z range excluding the exclusion m/z range is set as a new measurement m/z range (step S26).

For example, the exclusion m/z range indicated by ΔP in FIG. 8D can be defined based on the m/z value corresponding to one regression coefficient illustrated in FIG. 8C. The m/z value search section 17 searches the measurement m/z range from which the one or more exclusion m/z ranges are excluded, for the regression coefficient with the maximum absolute value and selects the m/z value corresponding to this regression coefficient (step S27). Thus, even if any regression coefficient with a large value exists in the immediate vicinity of the previously selected m/z value (within the above exclusion m/z range), the m/z value corresponding to this regression coefficient will not be selected. Here, it is assumed that the one indicated by a circle in FIG. 8E is found in searching the measurement m/z range illustrated in FIG. 8D for the maximum regression coefficient.

After that, it is determined whether a predetermined ending condition is satisfied (step S28), and if not, the process returns from step S28 to step S26. The ending condition in this process is the same as the ending condition in step S18 described above.

In any case, the process in steps S26 to S28 is repeated until it is determined in step S28 that the ending condition is satisfied. For example, when the process returns to step S26 after the one indicated by a circle illustrated in FIG. 8E is selected, as illustrated in FIG. 8F, the exclusion m/z range including the newly selected m/z value is excluded from the measurement m/z range. Thus, even if any ion peak originating from an isotope exists in the vicinity of the m/z value already selected on the mass spectrum, the m/z value of this ion peak will not be selected.

In the imaging mass spectrometers of any of the above embodiments, while selection of the m/z value of ions originating from an isotope of a certain compound as a candidate is avoided, the m/z value of ions originating from the compound exhibiting a two-dimensional distribution similar to the image pattern of the reference image can be accurately selected as an m/z value candidate. That is, it is possible to avoid selection of the m/z value of ions originating from one compound and the m/z value of ions originating from an isotope of the same compound in duplicate.

While PLS is used for the statistical analysis process in the above embodiments, multivariate analysis other than PLS may be used instead as long as such a technique can obtain an index value reflecting the similarity of the image patterns between the two-dimensional distribution of ion intensity and the reference image for each m/z. Specifically, correlation analysis or the like can be used.

The embodiments described above are examples of the present invention, and thus modification, correction, and addition to the embodiments without departing from the gist of the present invention are apparently included in the scope of the claims of the present application.

REFERENCE SIGNS LIST

1 . . . Data Processing Unit
11 . . . Reference Image Data Storage Section
12 . . . MS Imaging Data Storage Section
13 . . . Reference Image Creator
14 . . . MS Image Creator
15 . . . Calculation Data Creator
16 . . . Regression Analysis Executor
17 . . . m/z Value Search Section
18 . . . m/z Candidate Presentation Section
2 . . . Operation Unit
3 . . . Display Unit
4 . . . Imaging Mass Spectrometric Analysis Unit
5 . . . Reference Image Capturing Unit
6 . . . Sample

The invention claimed is:

1. A data processing device for imaging mass spectrometric analysis that processes mass spectrum data obtained at a plurality of measurement points in a two-dimensional measurement area on a sample, the data processing device comprising:
   a) a reference image information acquisition section that acquires reference image data forming a reference image for the measurement area;
   b) an analysis processor that calculates, for each mass-to-charge ratio, an index value related to similarity of an image pattern of an MS image exhibiting a distribution of a signal intensity of ions having the mass-to-charge ratio and the reference image, through statistical analysis based on the mass spectrum data of each measurement point in the measurement area and the reference image data acquired by the reference image information acquisition section; and
   c) a mass-to-charge ratio value search section that searches for and selects, in each of a plurality of predetermined mass-to-charge ratio ranges, one or more mass-to-charge ratios exhibiting a relatively large index value among index values for respective mass-to-charge ratios obtained by the analysis processor, and further determines, in the each of the plurality of predetermined mass-to-charge ratio ranges, one mass-to-charge ratio exhibiting a largest index value among the one or more mass-to-charge ratios.

2. The data processing device for imaging mass spectrometric analysis according to claim 1, wherein
   the plurality of predetermined mass-to-charge ratio ranges are consecutive and are obtained by dividing an entire measurement mass-to-charge ratio range by a width of each predetermined mass-to-charge ratio.

3. The data processing device for imaging mass spectrometric analysis according to claim 1, wherein the mass-to-charge ratio value search section selects mass-to-charge ratio values exhibiting a largest index value in each of the plurality of predetermined mass-to-charge ratio ranges, and thereafter selects a mass-to-charge ratio value exhibiting an index value that is equal to or more than a predetermined threshold among the selected plurality of mass-to-charge ratio values.

4. The data processing device for imaging mass spectrometric analysis according to claim 1, wherein the mass-tocharge ratio value search section selects a plurality of mass-to-charge ratio values in descending order of index values in an entire mass-to-charge ratio range of a measurement target.

5. The data processing device for imaging mass spectrometric analysis according to claim 1, wherein the mass-to-charge ratio value search section selects one mass-to-charge ratio value, thereafter determines an exclusion range with same or different widths set in a decreasing direction and an increasing direction of the mass-to-charge ratio with respect to the one mass-to-charge ratio value, and excludes other mass-to-charge ratio values included in the exclusion range from the selection target.

6. The data processing device for imaging mass spectrometric analysis according to claim 5, wherein the mass-to-charge ratio value search section selects a plurality of mass-to-charge ratio values in descending order of index values in a mass-to-charge ratio range of a measurement target.

7. The data processing device for imaging mass spectrometric analysis according to claim 1, wherein the statistical analysis is partial least-square regression analysis, and the index value is a regression coefficient.

8. The data processing device for imaging mass spectrometric analysis according to claim 2, wherein the statistical analysis is partial least-square regression analysis, and the index value is a regression coefficient.

9. The data processing device for imaging mass spectrometric analysis according to claim 3, wherein the statistical analysis is partial least-square regression analysis, and the index value is a regression coefficient.

10. The data processing device for imaging mass spectrometric analysis according to claim 4, wherein the statistical analysis is partial least-square regression analysis, and the index value is a regression coefficient.

11. The data processing device for imaging mass spectrometric analysis according to claim 5, wherein the statistical analysis is partial least-square regression analysis, and the index value is a regression coefficient.

12. The data processing device for imaging mass spectrometric analysis according to claim 6, wherein the statistical analysis is partial least-square regression analysis, and the index value is a regression coefficient.

* * * * *